Oct. 7, 1952     W. L. POLLARD     2,612,721
BOOKHOLDER
Filed Dec. 20, 1946     3 Sheets-Sheet 1
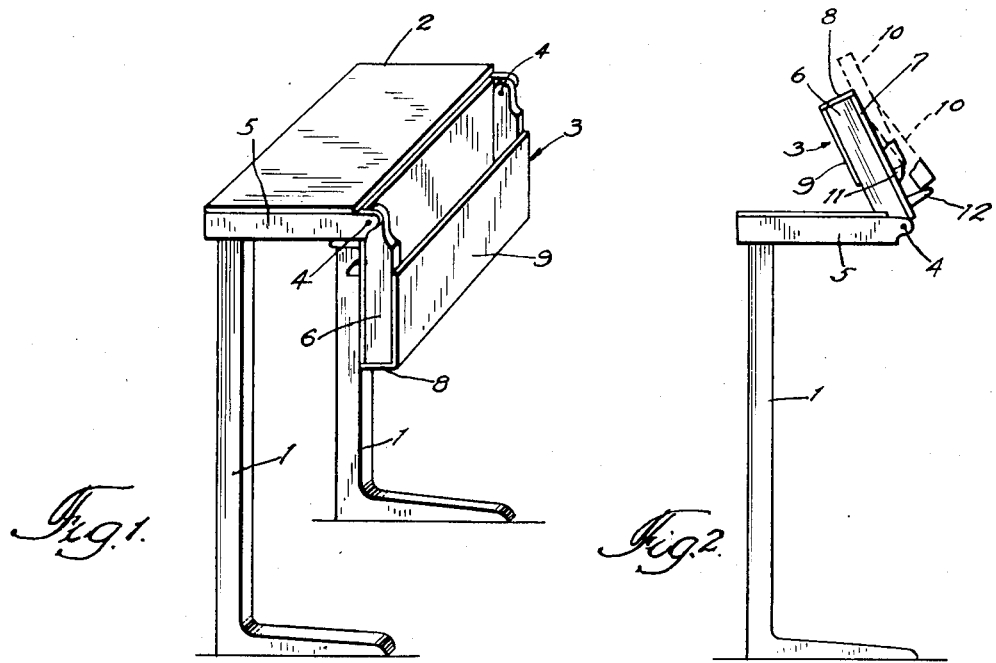
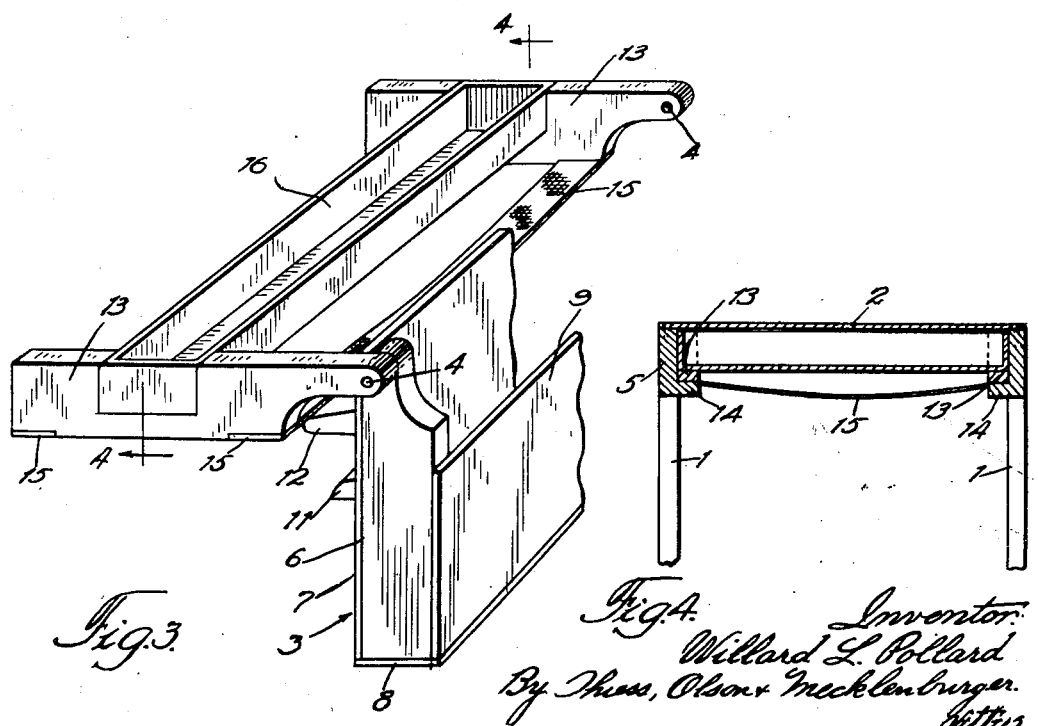
Inventor:
Willard L. Pollard
By Thiess, Olson & Mecklenburger
Attys.

Oct. 7, 1952     W. L. POLLARD     2,612,721
BOOKHOLDER
Filed Dec. 20, 1946     3 Sheets-Sheet 2
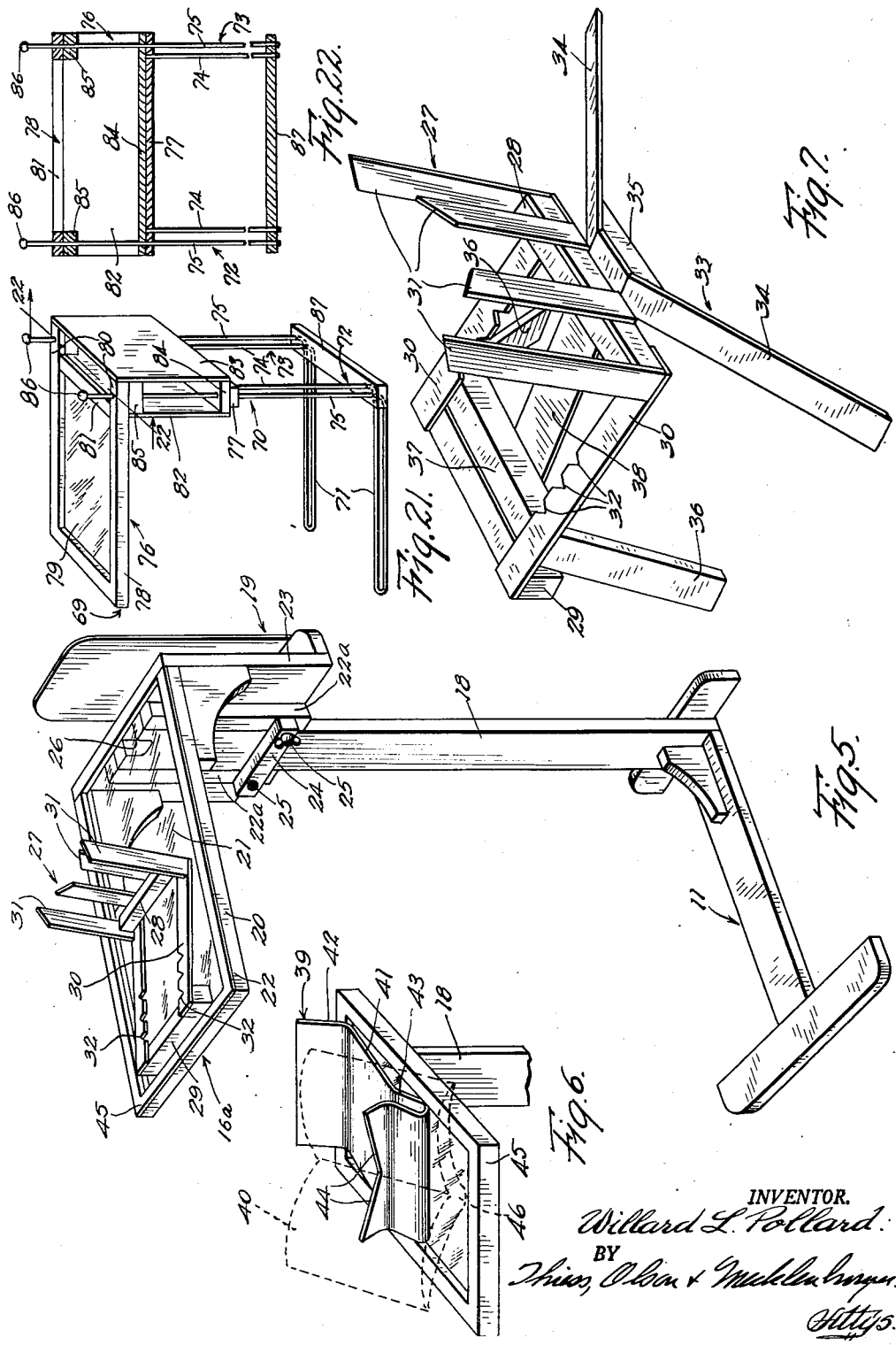
INVENTOR.
Willard L. Pollard.
BY
Thiess, Olson & Mechlenburger.
Attys.

Oct. 7, 1952 W. L. POLLARD 2,612,721
BOOKHOLDER
Filed Dec. 20, 1946 3 Sheets-Sheet 3

INVENTOR
Willard L. Pollard.

Patented Oct. 7, 1952

2,612,721

UNITED STATES PATENT OFFICE 2,612,721

BOOKHOLDER

Willard L. Pollard, Evanston, Ill.

Application December 20, 1946, Serial No. 717,336

1 Claim. (Cl. 45—57)

My invention relates to bookholders.

This application is a continuation in part of my copending application Serial No. 531,403, filed April 17, 1944, now abandoned.

One of the objects of my invention is to provide an improved bookholder construction in which the bookholder is mounted on a table and movable from a lowered position in which it serves as a book receptacle to a raised position for holding the book in position to be read.

A further object is to provide such a construction in which the bookholder per se can be readily detached from the table and supported on the lap.

A further object is to provide a construction in which the bookholder is mounted on a slide under the table top so that the slide can be drawn outwardly to expose a receptacle.

A further object of my invention is to provide an improved bookholder which can be drawn up to a chair so as to hold the book in proper position with respect to one sitting in the chair.

A further object is to provide an improved bookholder having a flexible strap support for resting on the lap of the user.

A further object of my invention is to provide a bookholder having means for holding a plurality of books in shelved position and also for holding a book in readable position.

A further object is to provide a bookholder for holding a plurality of books in inclined stacked position.

Further objects and advantages of the invention will be apparent from the description and claim.

In the drawings, in which two forms of my invention are shown,

Figure 1 is a perspective view of a combination table and bookholder;

Fig. 2 is a side elevation of the construction shown in Fig. 1, showing the bookholder in raised position;

Fig. 3 is a perspective view showing another form of bookholder;

Fig. 4 is a cross-sectional view substantially on the line 4—4 of Fig. 3;

Fig. 5 is a perspective view showing another form of bookholder;

Fig. 6 is a detail view showing the table top with a book receptacle and book support thereon;

Fig. 7 is a perspective view showing the book support of Fig. 5 mounted on a lap-supported holder;

Fig. 21 is a perspective view showing an adjustable book-supporting table; and

Fig. 22 is a section substantially on the line 22—22 of Fig. 21.

Figure 8:
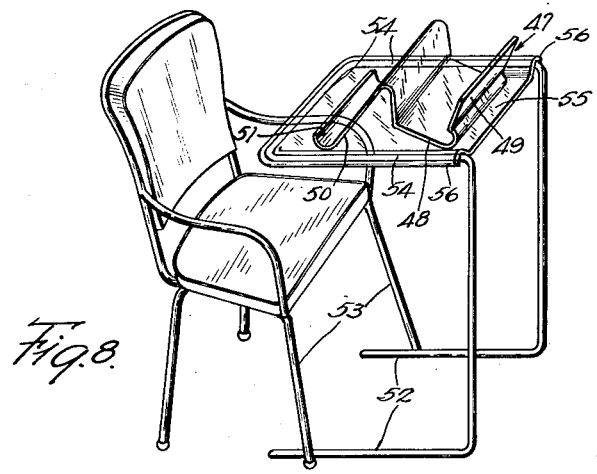
Fig. 8 is a perspective view of another form of table and book receptacle and holder showing its position with respect to the chair in which the reader sits.

Referring first to Figs. 1 and 2, the construction shown therein comprises a table having L-shaped legs 1 and a table top 2, and a combination book receptacle and bookholder 3 pivotally mounted at 4 on the side pieces 5 of the table. The book receptacle and holder 3 comprises the end pieces 6 which are pivotally secured to the table, the bookholding support 7 secured to these end pieces 6, the strip 8 forming the bottom of the book receptacle, and the front panel forming the front of the book pocket.

In order to hold the book 10 in various positions of adjustment as shown in Fig. 2, a number of book rests 11 and 12 are provided on any one of which the lower edge of the book may be placed when in raised position.

Any suitable materials may be used in the construction, such as wood, plastic, metal, or the like.

In use, when the bookholder is in the position shown in Fig. 1, the book may be placed in the book pocket and the table may be used as an ordinary table. When the bookholder is raised to the position shown in Fig. 2, it may be drawn up to a chair and the bookholder may be raised to the position shown to support the book 10 in any one of a number of positions on the shelves 11 and 12.

The construction shown in Figs. 3 and 4 is quite similar to that shown in Figs. 1 and 2 except that here the bookholder 3 is pivotally secured at 4 to slides 13 which are mounted to slide on guides 14 extending inwardly from the sides 5 of the table, a pair of lap straps 15 are secured to the lower edges of the slides 13, and that the two slides 13 are secured together and held in proper spaced relation by means of a drawer or receptacle 16.

In this form the table may be used just as in the construction shown in Figs. 1 and 2 and, in addition, the slides 13 may be withdrawn from the table and the bookholder per se may be used as a lap bookholder by resting the straps 15 on the lap, the bookholder being swung upwardly to the relative position shown in Fig. 2. The slides 13 enable the reader to make a fore-and-aft adjustment of the bookholder 3 with respect to the table to secure the desired reading position.

The construction shown in Fig. 5 comprises a table 16a having a base 17 extending forwardly from the upright post 18 and a unitary bookrack 19 and table top 20 vertically adjustable on this post. The table extends forwardly from the post so as to be in position above the lap of a reader seated in a chair. The table top may comprise a glass panel 21 set in a grooved rectangular frame 22.

This glass panel 21 enables the user to place his hand in proper position for effecting the raising and lowering of the table top. For guiding the table top in its up-and-down movement, a pair of cleats 22a are secured to the upright board 23, one on each side of the post 18, and a clamping strip 24 extends between these guide strips and is adjustably secured thereto by means of bolts and clamping nuts 25. In order to facilitate raising the table, a thumb notch 26 is placed in the top of the post 18. With this construction, by placing the thumb in the thumb notch 26 and the fingers underneath the clamping strip 24 and loosening up the clamping nuts 25, the table top may be readily raised by a gripping action of the thumb and fingers.

The book receptacle and holder 27, as shown, may be made of wood comprising a pair of crosspieces 28 and 29 for resting on the glass 21, a pair of longitudinally-extending bars 30 secured to and connecting these crosspieces and a plurality of book back engaging uprights 31 secured to the rear crosspiece 28. The height of each of these uprights is such that it will hold the book open to the right extent for easy reading. In order to secure the right tilt to the book, the side bars 30 may be provided with notches 32 which will engage the lower edges of the covers of the book. The central cover connecting portion of the book may rest on the table top. With this construction a number of books may be placed with their lower edges down and resting on the longitudinally-extending bars 30 with the back of the rearmost book leaning up against two side posts 31. The side edges of the frame 22 serve to guide the bookholder 27 to enable the reader to slide it fore and aft on the table top and to maintain the holder in substantial alignment on the top.

Fig. 7 shows the bookholder of Fig. 5 removed from the table top and fitted on a lap-supported stand 33. This lap-supporting mounting comprises a front pair of gradually sloping legs 34 secured to a connecting block 35 for engaging the lap of the reader adjacent the knees, a second rear pair of sloping lap-engaging legs 36 and connecting blocks 37 spaced from the first pair of legs for engaging the lap of the wearer remote from the knees, and a longitudinally-extending connecting strip 38 for securing two connecting blocks 35 and 37 together.

In use, the rear crosspiece 28 of the holder rests on the connecting strip 38 and the ends of the side bars 30 rest on the horizontally-extending connecting block 27 connecting the two legs.

Figure 9:
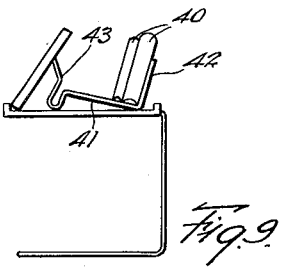
Fig. 9 is a side elevational view showing another form of book receptacle and holder mounted on a table.

Figs. 6 and 9 show a somewhat different form of bookholder 39 which may be used with the table shown in Fig. 5. This form of holder may, if desired, be formed of sheet thermoplastic material having a side elevation as shown in Fig. 9 such that a stack of books 40 may be placed on the lower inclined shelf-portion 41 and lean back against the rear sloping wall 42 of the holder. The shelf 41 is long enough to accommodate at least two books, each having a thickness of one inch and preferably a greater number. The front part of the holder 43 extends upwardly and has its upper edge of a wide V shape at 44 to hold the book open in the right position for reading. As shown in Fig. 6 the bottom edges of the book covers may rest on the side portions of the rectangular frame 45, the central back portion 46 of the book resting on the depressed glass portion 21 of the table top.

Figure 10:
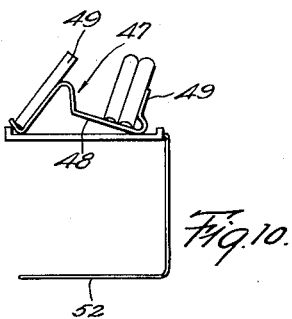
Fig. 10 is a side elevational view showing the book receptacle and holder of Fig. 8 mounted on a table.

The bookholder 47 of Figs. 8 and 10 also may be made of sheet plastic, if desired, shaped to provide a sloping shelf 48 for the lower edges of the book covers and a sloping rear support 49 for the rearmost book, thus holding a stack of books in inclined stacked position. The front 50 of the holder is shaped to provide a support for the covers of a book for holding it is open inclined readable position and a forwardly-extending ledge 51 for the lower edges of the covers of the book.

The table shown in Fig. 8 comprises a supporting frame of bent rod or tubing having floor-engaging feet 52 close enough together to enter between the front legs 53 of a chair and a U-shaped table top supporting frame 54. The table top 55 may be of transparent sheet thermoplastic material having its edges bent or curled about the U-shaped frame 54 at 56. The central portion of the top may be depressed below the upper edge of the curled portions 5 so that these upstanding curled edges serve to hinder the bookholder 47 from slipping off the table top. These curled edges also serve to guide the bookholder to enable the reader to slide it fore and aft on the table top and to hold it in substantial alignment on the top.

Figs. 11–15, inclusive, show five different uses of a combination bookrack and bookholder 57. This holder may be made of three pieces of wood, or other suitable material, 58, 59 and 60, secured together as shown.

Figure 11:
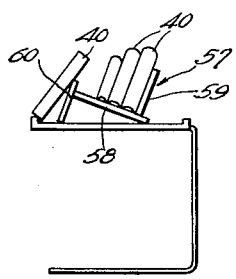
Fig. 11 is a side elevational view showing a somewhat different form of book receptacle and holder mounted on a table.

Fig. 11 shows the holder in position to support a stack of books 40 in inclined shelved position and shows a book supported in readable position by the front 60 of the holder.

As shown in Figs. 9, 10, and 11, the holders comprise two cantilever beam members 41 and 42 of Fig. 9, 48 and 49 of Fig. 10, and 58 and 59 of Fig. 11, extending substantially at right angles with respect to each other having book-supporting surfaces, one of which surfaces has such an extent as to be engageable by the edges of the covers of a plurality of books placed thereon, and the other of which has an extent such as to be engageable by the cover of the rear book and to support the books in upwardly and rearwardly extending position, said cantilever beams being rigidly united with respect to each other, whereby they act as a lever of the first class for engaging a flat horizontal support adjacent their union as a fulcrum, for transmitting the gravitational force exerted as a downward pressure by the lower edges of the books on the book edge supporting surface, to act as a force exerting forward pressure from the other beam on the cover of the rear book.

Figure 12:
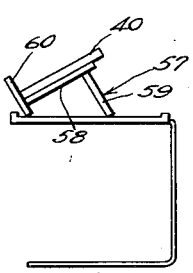
Fig. 12 shows the receptacle and holder of Fig. 11 in a different position.

Fig. 12 shows the holder in a different position, upside down, with a book supported in reading position by the section 58.

Figure 13:
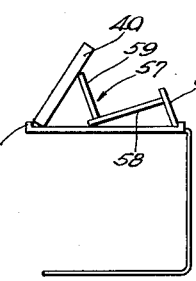
Fig. 13 shows the receptacle and holder of Fig. 11 in still another position.

Fig. 13 shows the holder reversed, end for end, from the position shown in Fig. 11, with a book held in reading position by the engagement of its covers with the section 59. The front edge of the book is held against slipping by the rim 61 of the table top which extends above the central portion.

Figure 14:
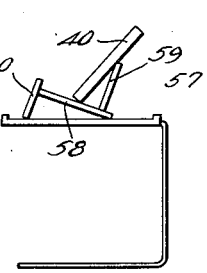
Fig. 14 shows still another position of the receptacle and holder of Fig. 11.

Fig. 14 shows a book supported in reading position by means of the section 59, the lower edges of the book covers resting on the section 58.

Figure 15:
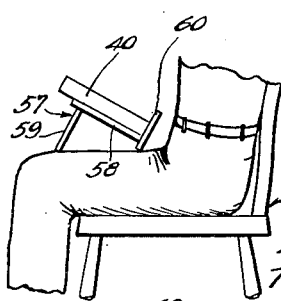
Fig. 15 shows this holder and receptacle in position on the lap of the reader.

Fig. 15 shows the bookholder in position on the lap of a reader, seated in the chair 62, with the book 40 supported in open reading position by means of the section 58, the lower edge of the sections 59 and 60 resting on the lap of the reader.

Figure 16:
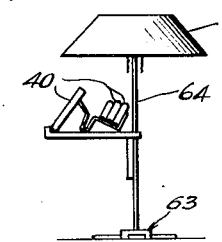
Fig. 16 is an elevational view showing the combination of table, lamp and bookholder.
Figure 17:
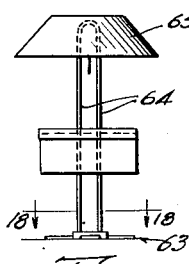
Fig. 17 is a view from the left of Fig. 16, the bookholder being omitted.
Figure 18:
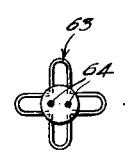
Fig. 18 is a bottom view showing the base of the lamp and table.

Figs. 16, 17 and 18 show a combination of lamp, table and bookholder. The lamp has a pedestal comprising a base portion 63 and a pair of uprights 64 mounted on the base portion on the upper part of which the lamp and shade 65 are mounted. The table is vertically adjustable on the uprights somewhat in the manner shown in Fig. 5. The bookholder shown is the same as that shown in Fig. 9.

Figure 19:
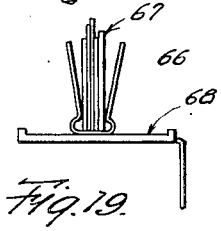
Fig. 19 is a side elevational view showing still another form of receptacle and holder in combination with a table.
Figure 20:
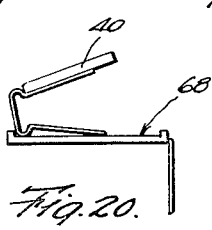
Fig. 20 shows the holder of Fig. 19 in position to hold a book in reading position.

Figs. 19 and 20 show a holder 66 which might be suitable for holding magazines 67 as shown in Fig. 19 but which may be laid over on its side on the table 68 to hold a book or magazine in reading position. This form also may be made of sheet plastic if desired.

Figs. 21 and 22 show a table in which the table top 69 on which the bookholder rests is mounted for up-and-down adjustment, as in the construction of Fig. 5. The construction shown comprises a supporting frame 70 formed in general of bent rod or tubing shaped to provide two looped floor-engaging portions 71 and two upright legs 72 and 73, each comprising a pair of upright leg portions 74 and 75 extending upwardly from the U-shaped foot portions on which the book-supporting table top and bookrack 76 are mounted for up-and-down adjustment. One upright 74 of each of the legs is shorter than the other 75, the vertically adjustable table top and rack being slidable up and down on that part of the longer upright 75 which extends above the shorter upright 74.

In order to limit the downward movement of the table top and rack 76 and to hold the legs in proper relative position, a crosspiece 77 of wood or suitable material extends between the two pairs of uprights and is firmly secured to all four of the uprights as shown in Fig. 22.

The table top comprises a rectangular frame 78 in which the glass 79 of the table top may be mounted, having portions 80 extending rearwardly beyond the rear frame member 81 provided with openings through which the upper ends of the longer uprights 75 extend, the openings being large enough to provide a free sliding fit.

The bookrack comprises front and rear sides 82 and 83, secured to the rectangular frame, as shown in Fig. 21, and a bottom portion 84 to which the lower edges of the front and rear sides 82 and 83 of the bookrack are secured. The bottom 84 of the bookrack is provided with openings through which the extensions of the longer uprights 75 extend, the fit being such as to provide for free sliding movement. If desired reinforcing blocks 85 may be provided, fitting the underside of the extended frame portions 80 and fitting between the front and rear sides 82 and 83 of the bookrack.

The upper ends of the longer uprights 75 may be provided with thumb buttons 86 to facilitate raising and lowering the table top and bookrack. To raise the table top, the two thumbs may be placed on top of the two thumb buttons 86, respectively, and the fingers engaged underneath the frame of the table top so that by exerting gripping pressure the table top and bookrack may be raised to any desired adjusted position. The overhanging weight of the table top is sufficient to hold it in any position to which it may be adjusted as it causes a binding action at the openings through which the upright extensions 75 pass.

If desired, the thumb buttons 86 may be screwed onto the upper ends of the uprights 75 to enable the read detachment of the table top and the crosspieces 77 and 87.

Further modifications will be apparent to those skilled in the art and it is desired, therefore, that the invention be limited only by the scope of the appended claim.

Having thus described my invention, what I claim and desire to secure by Letters Patent is:

A bookholder for resting on a horizontal supporting surface, comprising a body of relatively nonyielding material having a first substantially rectangular flat book edge supporting surface and a second substantially rectangular flat book cover supporting surface, said first surface extending downwardly and rearwardly and having such an extent as to be engageable by the edges of the covers of a plurality of books placed thereon, and said second surface extending upwardly and rearwardly and having such an extent as to be engageable by the cover of the rear book and support the books in upwardly and rearwardly extending position, said body having a front transversely extending stop bar adjacent and extending upwardly above the front edge of said first flat supporting surface to prevent the lower edges of the books from slipping off said first surface and having a transversely extending front leg adjacent and extending downwardly below the front edge of said first surface, and having a lower contact edge for engagement with said holder supporting surface, said body having a second transversely extending contact edge for engagement with said holder supporting surface, said second contact edge being located substantially adjacent the intersection of said first and second surfaces, the entire holder between said edges lying a distance above the plane of said edges.

WILLARD L. POLLARD.

REFERENCES CITED

The following references are of record in the file of this patent:

UNITED STATES PATENTS

| Number | Name | Date |
|---|---|---|
| 573,089 | Haynes | Dec. 15, 1896 |
| 1,554,979 | Dugan | Sept. 22, 1925 |
| 1,787,363 | Fahnestock | Dec. 30, 1930 |
| 1,813,793 | Bullock | July 7, 1931 |
| 1,942,456 | Stark | Jan. 9, 1934 |
| 1,976,031 | Lowenberg | Oct. 9, 1934 |
| 2,001,139 | Johnson | May 14, 1935 |
| 2,012,551 | Steen | Aug. 27, 1935 |
| 2,151,269 | Grant | Mar. 21, 1939 |
| 2,260,732 | Anderson et al. | Oct. 28, 1941 |
| 2,388,771 | Thompson | Nov. 13, 1945 |
| 2,490,356 | Hummel | Dec. 6, 1949 |